United States Patent [19]
Matsumoto

[11] Patent Number: 6,118,990
[45] Date of Patent: Sep. 12, 2000

[54] RECEIVING APPARATUS WITH DIVERSITY

[75] Inventor: Yutaka Matsumoto, Fujisawa, Japan

[73] Assignee: Kabushiki Kaisha Toshiba, Kawasaki, Japan

[21] Appl. No.: 09/010,112

[22] Filed: Jan. 21, 1998

[30] Foreign Application Priority Data

Jan. 28, 1997 [JP] Japan .................................. 9-014005
Jan. 6, 1998 [JP] Japan .................................. 10-000765

[51] Int. Cl.[7] .................................................. H04B 7/08
[52] U.S. Cl. ................. 455/277.1; 455/272; 455/226.1; 455/231
[58] Field of Search .............................. 455/277.1, 277.2, 455/272, 132, 134, 226.1, 226.2, 230, 231

[56] References Cited

U.S. PATENT DOCUMENTS

| | | | |
|---|---|---|---|
| 5,379,449 | 1/1995 | Porambo ................................. | 455/506 |
| 5,430,769 | 7/1995 | Patsiokas et al. ........................ | 375/347 |
| 5,548,836 | 8/1996 | Taromaru ................................ | 455/277.1 |
| 5,603,107 | 2/1997 | Gottfried et al. ....................... | 455/133 |
| 5,692,019 | 11/1997 | Chang et al. ........................... | 375/347 |

*Primary Examiner*—Dwayne D. Bost
*Assistant Examiner*—Erika A. Gary
*Attorney, Agent, or Firm*—Oblon, Spivak, McClelland, Maier & Neustadt, P.C.

[57] ABSTRACT

This invention is to provide a receiving apparatus with diversity, including a first reception unit for receiving a radio signal, a second reception unit for receiving a radio signal, a selection unit for selecting one of the first and second reception unit, a detection unit for detecting that a electric field intensity of the radio signal received by the first or second reception unit selected by the selection unit lowers to a predetermined electric field intensity or less, and a switching unit for causing the selection unit to alternately select the first and second reception unit in a predetermined time when the detection unit detects that the electric field intensity of the radio signal lowers to the predetermined electric field intensity or less.

16 Claims, 7 Drawing Sheets

RECEIVING APPARATUS WITH DIVERSITY

BACKGROUND OF THE INVENTION

The present invention relates to a receiving apparatus with diversity, which has a reception antenna switching function and is used in the field of mobile communication and, more particularly, to a controller which selectively switches the reception outputs from two antennas and is used in a receiving apparatus for receiving, e.g., FM or TV broadcasting in the VHF or higher frequency band.

Receiving apparatuses with diversity are of two-tuner diversity which switches two sets of reception antennas and receiving apparatuses and antenna switching diversity which switches two reception antennas.

The antenna switching diversity basically operates as follows. Upon detecting from a multi-path distortion (noise) or the like that a multi-path wave (synthesized wave of radio waves which had arrived via different paths) or antenna noise has arrived at one antenna which is currently connected to the tuner unit of the receiving apparatus, the connection to the tuner unit is switched to the other antenna.

An automobile receiving apparatus as prior art 1 is a system using a rod antenna as a main antenna and a glass antenna as a subantenna arranged on the rear windshield of an automobile. When the electric field of a received wave is weak, the antenna connection of the receiving apparatus is forcibly fixed to the rod antenna side. The rod antenna rarely has gain directivity, so the reception sensitivity of the tuner does not depend on the arrival direction of a radio wave.

An automobile receiving apparatus as prior art 2 is a system using two glass antennas which are arranged on the rear windshield of an automobile such that they have orthogonal electrical phase angles (directivities). When the electric field of a received wave is weak, antenna connection of the receiving apparatus is forcibly fixed to one glass antenna side.

This system using two glass antennas is expected to be a future mainstream because it does not impair the outer appearance or running performance of the automobile. More specifically, when connection is forcibly fixed to the rod antenna side for a weak field, as in prior art 1, damage of the rod antenna itself or a mechanical change over time poses a problem. However, in prior art 2, the diversity operation is realized while keeping the glass antenna connected, so the glass antenna itself is hardly damaged.

The arrangement of the conventional receiving apparatus will be briefly described below with reference to FIG. 1. Referring to FIG. 1, an antenna switching circuit 50 selectively connects two glass antennas 51 and 52 to a front end section (high frequency amplification/frequency conversion stage) 53 of the tuner unit.

Reference numeral 54 denotes an intermediate frequency amplifier for limiter-amplifying the output signal (intermediate frequency) from the front end section 53; 55, an FM demodulator for demodulating an FM signal from the output signal from the intermediate frequency amplifier 54; 56, a voltage-controlled amplifier with a soft muting function, which amplifies the output signal from the FM demodulator 55; and 57, a stereodecoder for decoding right and left component signals from the output signal (FM stereo composite signal) from the voltage-controlled amplifier 56.

A field strength detector (FSD) 58 detects the level of the output signal (intermediate frequency) from the intermediate frequency amplifier 54 to detect the field strength of the received radio wave.

A gain controller 59 controls the amplification gain of the voltage-controlled amplifier 56 on the basis of the output signal (signal meter output) from the FSD 58.

An antenna diversity controller 60 controls the antenna switching circuit 50 on the basis of the output signal from the FSD 58.

FIG. 2 is a block diagram showing a conventional example of the antenna diversity controller 60 shown in FIG. 1.

Referring to FIG. 2, an average variation detector 61 is constituted by, e.g., a CR circuit to weight the output (signal meter output) from the FSD 58 with a certain time constant and detect the average level variation.

An AC boost circuit 62 extracts the AC component of the output signal (signal meter output) from the FSD 58 and boosts it. The AC boost circuit 62 is arranged to determine the diversity operation sensitivity.

Reference numeral 63 denotes a bottom peak detector (BPD) for detecting the bottom peak of the output signal from the AC boost circuit 62; 64, a voltage comparator for comparing the output level from the average variation detector 61 with that from the BPD 63; and 65, a reset circuit for generating, on the basis of the output from the voltage comparator 64, a reset signal for resetting the BPD 63.

A flip-flop circuit 66 latches the output from the voltage comparator 64. The set output signal from the flip-flop circuit 66 is used to control the antenna switching circuit 50 to select one main antenna 51. The set output signal is inverted by an inverter 67. The inverted signal is used to control the antenna switching circuit 50 to select the other subantenna 52.

Since a glass antenna generally has a high gain directivity of about 20 dB in both the horizontal and vertical directions, the reception sensitivity of the receiving apparatus depends on the arrival direction of a radio wave.

When two glass antennas are arranged such that the directivities are orthogonalized, as described above, the reception sensitivity of the receiving apparatus abruptly lowers (drops to the null point) for a wave which has arrived at an angle of about $\pi/4$ (=45°) with respect to the electrical phase angle of the two glass antennas, and the antenna connection switching condition cannot be obtained.

More specifically, even when a radio wave having a field strength of, e.g., a bit higher than 20 dB, which can hardly be low, has arrived at the currently connected glass antenna at the angle of about 45°, the electric field is regarded as weak, and antenna connection of the receiving apparatus is switched to a specific glass antenna side.

However, if the condition is so bad that the radio wave cannot arrive at this glass antenna, neither multi-path distortion nor antenna noise can be detected because of very poor reception quality. Therefore, even when the radio wave is arriving at the other glass antenna, the antenna connection switching condition cannot be obtained, resulting in a fatal defect.

In addition, when the strength of the received field fairly lowers, as described above, soft muting (function of moderately muting the audio signal in response to the phenomenon of the received field to suppress an increase in white noise unique to the receiving apparatus) which is normally employed in the audio signal processing stage of the receiving apparatus suddenly functions. Consequently, muting is suddenly performed to largely impede the auditory sense.

As described above, the conventional receiving apparatus with diversity cannot detect a multi-path wave or antenna noise unless the radio wave arrives at the currently connected antenna. For this reason, even when the radio wave is arriving at the other antenna, the antenna connection switching condition cannot be obtained, resulting in a fatal defect.

BRIEF SUMMARY OF THE INVENTION

The present invention has been made to solve the above problem, and has as its object to provide a receiving apparatus with diversity capable of, when the a currently connected antenna cannot receive a radio wave, automatically switching connection to the other antenna after a predetermined time and of maintaining the reception state when the electric field of the received wave is not weak at the other antenna.

It is another object of the present invention to provide a receiving apparatus with diversity capable of, when a currently connected antenna cannot receive a radio wave and the electric field of the received wave is not weak at the other antenna, alternately switching two antennas within a predetermined time and selecting one of the two antennas, which has a higher received field strength, after the predetermined time to maintain the reception state.

In order to achieve the above objects, according to the first aspect of the present invention, there is provided a receiving apparatus with diversity, comprising:

first reception means for receiving a radio signal;

second reception means for receiving a radio signal;

selection means for selecting one of the first and second reception means;

detection means for detecting that a potential of the radio signal received by the first or second reception means selected by the selection means lowers to a predetermined potential or less; and first switching means for causing the selection means to alternately select the first and second reception means at in a predetermined time when the detection means detects that the potential of the radio signal lowers to the predetermined potential or less.

According to the second aspect of the present invention, the receiving apparatus with diversity of the first aspect further comprises multi-path detection means for detecting whether the radio signal received by the first or second reception means selected by the selection means is affected by a multi-path, and second switching means for causing the selection means to switch selection between the first reception means and the second reception means when the multi-path detection means detects that the received radio signal is affected by the multi-path.

According to the third aspect of the present invention, the receiving apparatus with diversity of the first aspect further comprises null point detection means for detecting that the potential of the radio signal received by the first or second reception means selected by the selection means lowers to the predetermined potential or less and then increases to the predetermined potential or more, and reset means for causing the first switching means to end selection when the null point detection means detects that the potential of the radio signal lowers to the predetermined potential or less and then increases to the predetermined potential or more.

According to the fourth aspect of the present invention, in the receiving apparatus with diversity of the first aspect, the first and second reception means have different electrical phases with each other, respectively.

According to the fifth aspect of the present invention, in the receiving apparatus with diversity of the first aspect, the switching means comprises a timer for outputting a time measurement signal for measuring a time when the detection means detects that the potential of the received radio signal lowers to the predetermined potential or less, pulse signal output means for outputting a pulse signal corresponding to the time measurement signal output from the timer, clock generation means for generating a clock signal for causing the selection means to switch selection between the first reception means and the second reception means, and gate means for outputting the clock signal generated by the clock generation means to the selection means while the pulse signal output means is outputting the pulse signal, and the selection means comprises a flip-flop circuit whose output is inverted every time the clock signal which has passed through the gate means is received.

According to the sixth aspect of the present invention, in the receiving apparatus with diversity of the fifth aspect, the clock signal generated by the clock generation means is obtained by frequency-dividing an output from a VCO in a pilot signal PLL in a stereodemodulator of an FM receiving apparatus.

According to the seventh aspect of the present invention, in the receiving apparatus with diversity of the fifth aspect, the clock signal generated by the clock generation means is obtained by frequency-dividing a reference clock of a microcomputer or a digital signal processor.

According to the eight aspect of the present invention, the receiving apparatus with diversity of the fifth aspect further comprises first holding means for holding a field strength of the radio signal received by the first reception means, second holding means for holding a field strength of the radio signal received by the second reception means, and comparison means for comparing the field strength held by the first holding means with that held by the second holding means, and the selection means selects one of the first reception means and the second reception means, which has a higher received field strength, on the basis of a comparison result from the comparison means after the pulse signal is output from the pulse signal output means.

According to the ninth aspect of the present invention, in the receiving apparatus with diversity of the first aspect, the movement means further comprises pseudo movement means for performing pseudo movement that the electric field intensity of the received radio signal lowers to the predetermined electric field intensity or less at a predetermined period independently of whether the electric field intensity of the received radio signal lowers to the predetermined electric field intensity or less.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The embodiments of the present invention will be described below with reference to the accompanying drawing.

Figure 3:
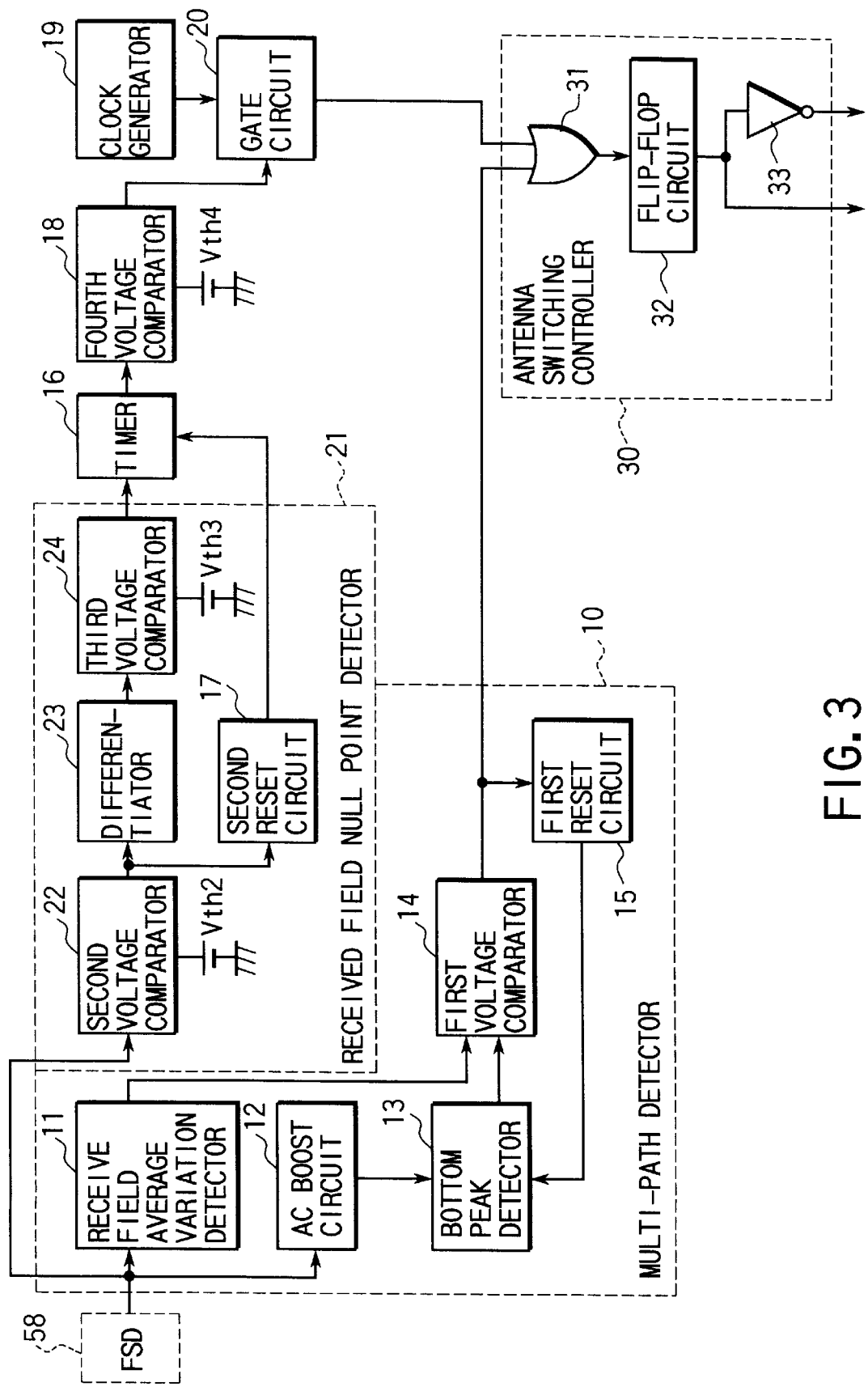
FIG. 3 is a block diagram showing an antenna diversity controller in an automobile FM receiving apparatus according to the first embodiment of the present invention.
Figure 4A:
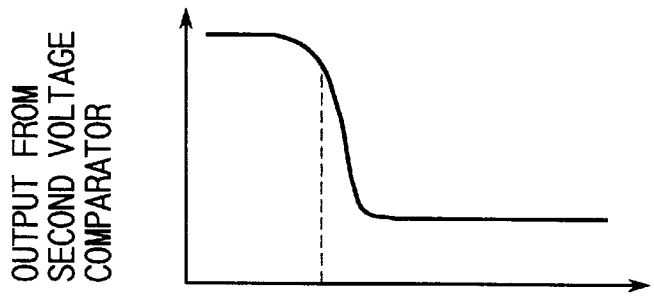
FIGS. 4A to 4E are graphs showing waveforms so as to explain the operation of the antenna diversity controller.
Figure 4B:
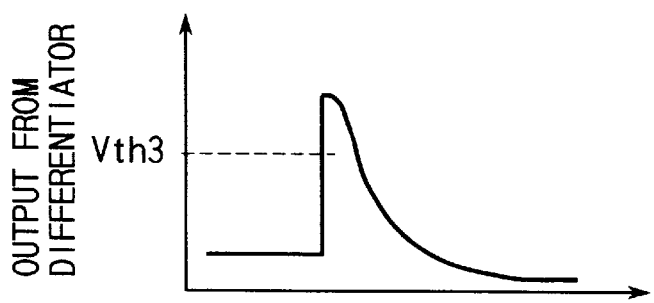
Figure 4C:
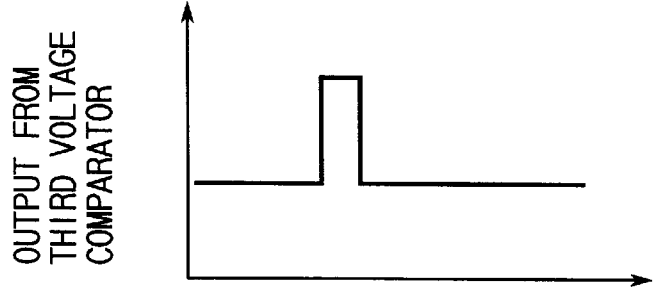
Figure 4D:
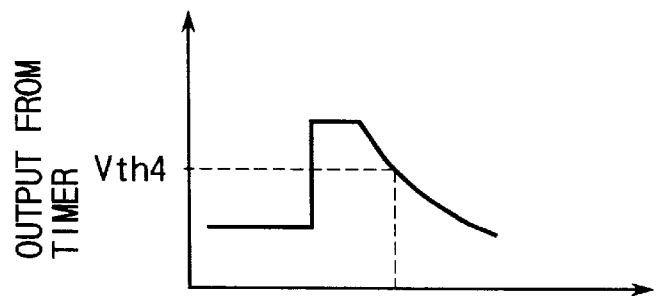
Figure 4E:
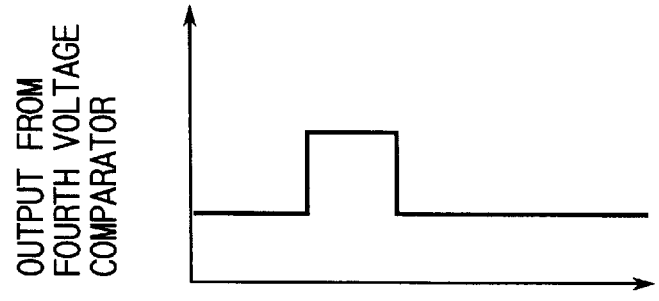

FIG. 3 is a block diagram showing an antenna diversity controller in a receiving apparatus with diversity as an automobile FM receiving apparatus according to the first embodiment of the present invention. This diversity controller is used as the antenna diversity controller 60 shown in FIG. 1.

Referring to FIG. 3, a received field average variation detector 11 is constituted by, e.g., a CR circuit to weight the output (signal meter output) from an FSD (58 in FIG. 1) with a certain time constant and detect the average level variation.

An AC boost circuit 12 extracts the AC component of the output signal (signal meter output) from the FSD (58 in FIG. 1) and boosts it. The AC boost circuit 12 is arranged to determine the diversity operation sensitivity.

Reference numeral 13 denotes a bottom peak detector (BPD) for detecting the bottom peak of the output signal from the AC boost circuit 12; 14, a first voltage comparator for outputting the comparison result between the output level from the received field average variation detector 11 and that from the BPD 13; and 15, a first reset circuit for generating, on the basis of the output from the first voltage comparator 14, a reset signal for resetting the BPD 13.

The received field average variation detector 11, the AC boost circuit 12, the BPD 13, the first voltage comparator 14, and the first reset circuit 15 form a multi-path detector 10 for detecting the input of a multi-path wave of a received field.

A received field null point detector 21 detects a state wherein the received field enters the null point or becomes weak. The received field null point detector 21 comprises a second voltage comparator 22 for comparing the output level from the FSD 58 with a predetermined reference potential Vth2 and outputting the comparison result, a differentiator 23 for differentiating the output from the second voltage comparator 22, a third voltage comparator 24 for comparing the output level from the differentiator 23 with a predetermined reference potential Vth3, and a second reset circuit 17 (arranged as needed) for detecting, on the basis of the output from the second voltage comparator 22, an instant at which the received field strength abruptly lowers, and generating a reset signal for resetting the operation of a timer 16.

The timer (time count circuit) 16 performs a time count operation during the detection output period of the received field null point detector 21. This timer 16 outputs a signal having a waveform which rises at the front edge of the output pulse signal from the third voltage comparator 24 and gradually falls at the end edge of the output pulse signal from the third voltage comparator 24.

Reference numeral 18 denotes a fourth voltage comparator for comparing the output level from the timer 16 with a predetermined reference potential Vth4 and outputting a pulse signal corresponding to the time count period; 19, a clock generator for generating a clock signal having a predetermined frequency; and 20, a gate circuit for passing the clock signal output from the clock generator 19 in accordance with the pulse signal generated by the fourth voltage comparator 18.

Reference numeral 31 denotes an OR circuit for ORing the output from the first voltage comparator 14 and the output from the gate circuit 20; and 32, a flip-flop circuit whose output is inverted every time the output from the OR circuit 31 is received.

The set output signal from the flip-flop circuit 32 is used to control an antenna switching circuit (50 in FIG. 1) to select a first antenna 51. The set output signal is inverted by an inverter 33. This inverted signal is used to control the antenna switching circuit (50 in FIG. 1) to select a second antenna 52.

An antenna switching controller 30 comprises the OR circuit 31, the flip-flop circuit 32, and the inverter 33.

More specifically, while the timer 16 is performing the time count operation, the flip-flop circuit 32 and the inverter 33 repeat an operation of automatically switching antenna connection of the FM receiving apparatus from one antenna side to the other for every switch time (clock period) generated on the basis of the clock signal. Upon completion of the time count operation of the timer 16, the operation returns to the basic operation of normal antenna switching diversity.

The operation of the antenna diversity controller shown in FIG. 3 will be described next with reference to waveforms shown in FIGS. 4A to 4E.

The received field null point detector 21 detects the period in which the received field strength abruptly lowers (drops to the null point). In response to this detection output, the timer 16 is started to perform the time count operation.

During the time count operation of the timer 16, the operation of automatically switching antenna connection of the FM receiving apparatus from one antenna side to the other is repeated for every switching time generated on the basis of the clock signal.

Assume that the automobile with the FM receiving apparatus moves or another automobile moves from the parking point of the automobile with the FM receiving apparatus, and the received field null point detector 21 detects that the received field strength of one antenna moves from the null point. In this case, a reset signal for causing the timer 16 to stop the time count operation is generated to restore the basic operation of normal antenna switching diversity.

Therefore, even when the electric field becomes weak while the receiving apparatus is being connected to the glass antenna, and a radio wave has arrived at the antenna from the null-point direction of gain directivity of the glass antenna to abruptly lower the received field strength, the antenna connection switching condition can be obtained.

That is, when the received field strength abruptly lowers during use of one antenna, antenna connection of the FM receiving apparatus is automatically switched to the other antenna side. For this reason, the received field can move from the null point in a very short time, and soft muting for the FM composite signal output can be canceled, so the auditory sense is not impeded. Since this operational principle is based on the basic operational principle of the current antenna switching diversity system, an on-chip system can be easily realized.

In the above example, after detection of the sudden decrease in received field by the received field null point detector 21, when the received field null point detector 21 detects a time point at which the received field strength of one antenna moves from the null point because of movement of the automobile with the FM receiving apparatus or movement of another automobile from the parking point of the automobile with the FM receiving apparatus, the basic operation of the normal antenna switching diversity is restored. However, strictly speaking, the following problems (a) and (b) are still kept unsolved.

(a) First, the probability that the received field of one antenna moves from the null point will be examined. Generally, this probability tends to be estimated as 50%. However, when the received field of one antenna enters the null point, the other antenna is also likely to enter a point equivalent to the null point at a high probability. The reason for this is as follows. The two glass antennas have the same desired radio wave. In addition, the two glass antennas have a gain directivity difference of π/2. If the other antenna is not entering the null point (in other words, the desired radio wave is arriving at the other antenna), the reflected wave of the desired radio wave is received. Therefore, the probability largely lowers from 50% at any point other than the area where the multi-path wave is strong.

(b) Next, the probability that another automobile moves from the parking point of the automobile with the FM receiving apparatus will be examined. In countries having large domains as in Europe, the automobile radio receiver is an important information source in case of automobile breakdown or accident in a suburb. As is apparent from this, there is need to consider a case in which the automobile can not be moved. In this case, the probability lowers from 50%.

An arrangement example of obtaining the antenna connection switching condition even when the probability lowers, as described above, will be described below.

Figure 1:
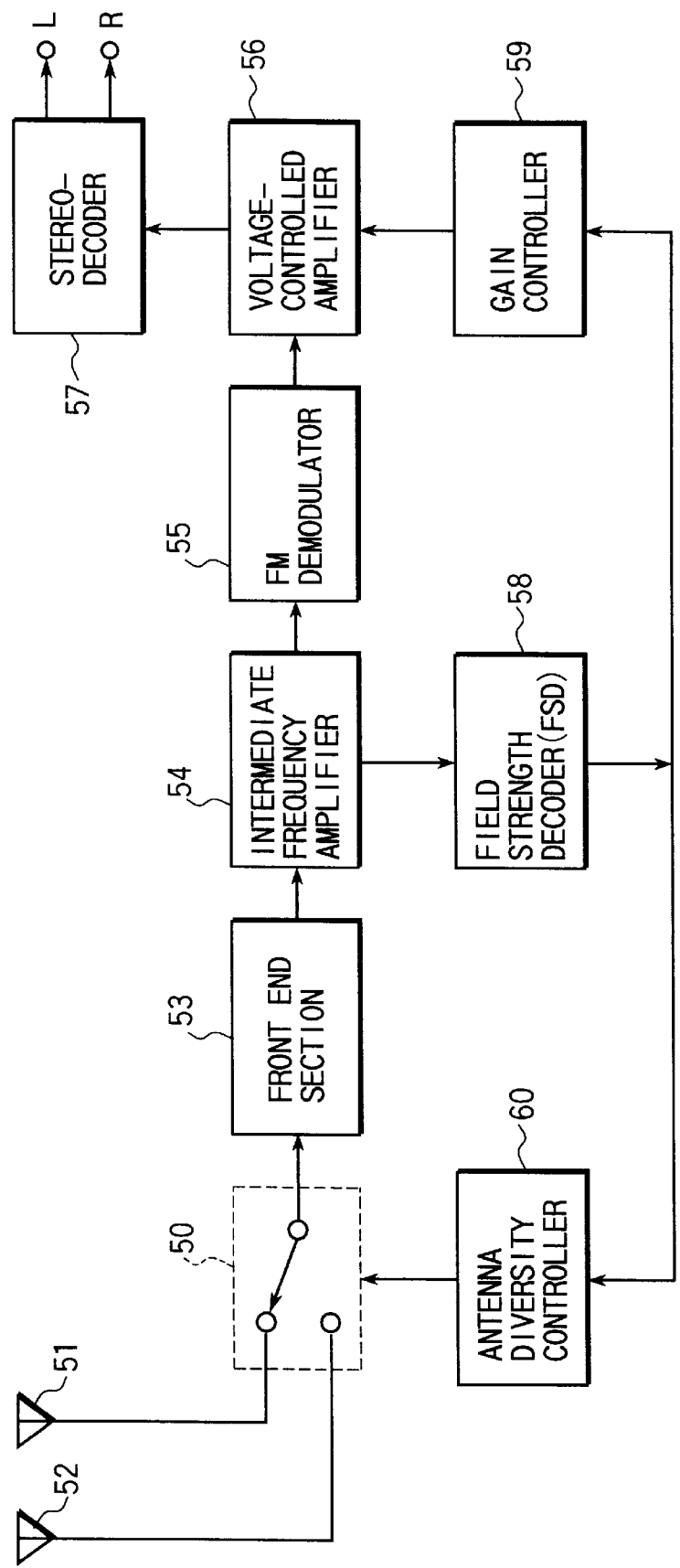
FIG. 1 is a block diagram partially showing a conventional FM receiving apparatus.
Figure 2:
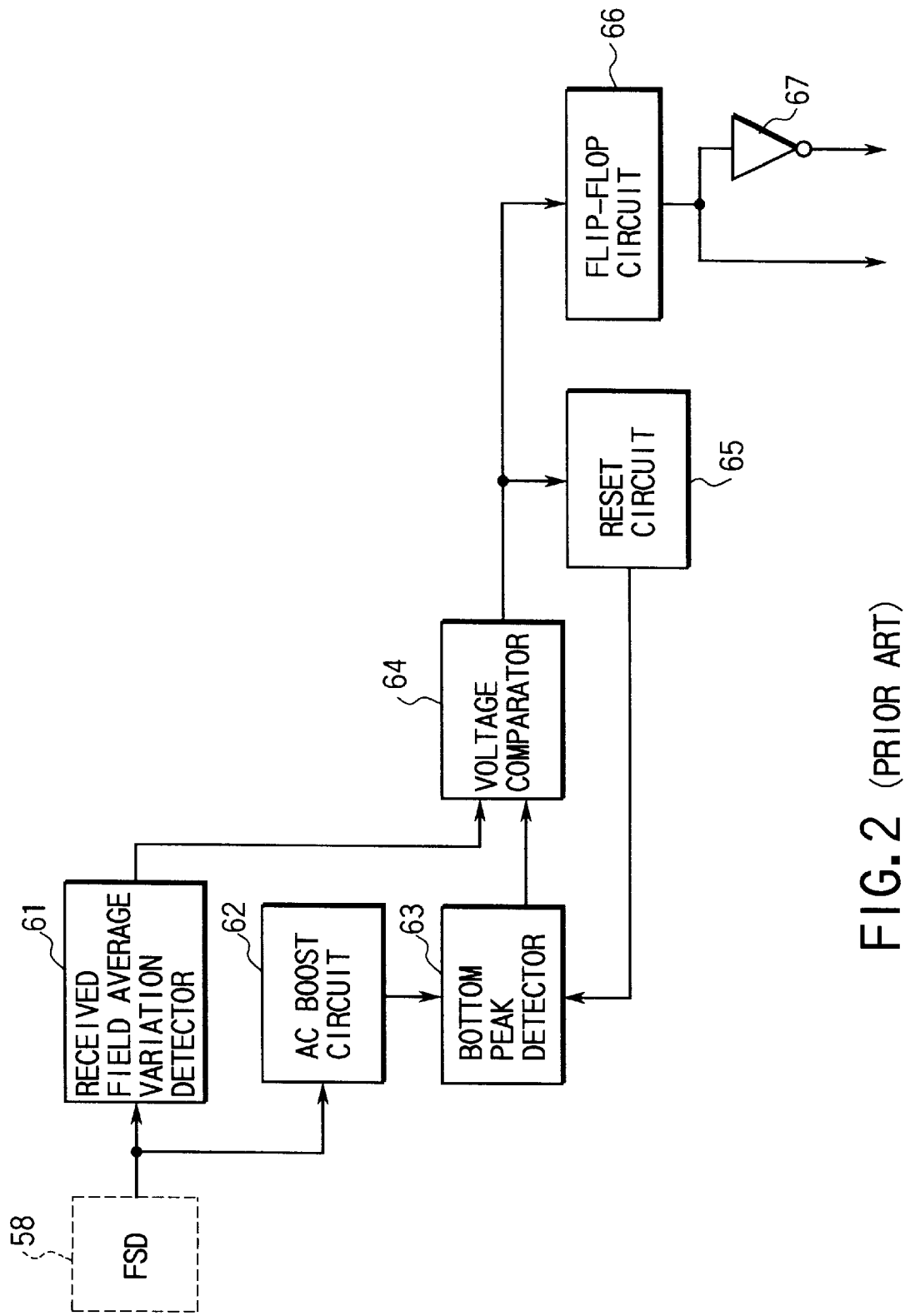
FIG. 2 is a block diagram showing a diversity controller in the conventional FM receiving apparatus.
Figure 5:
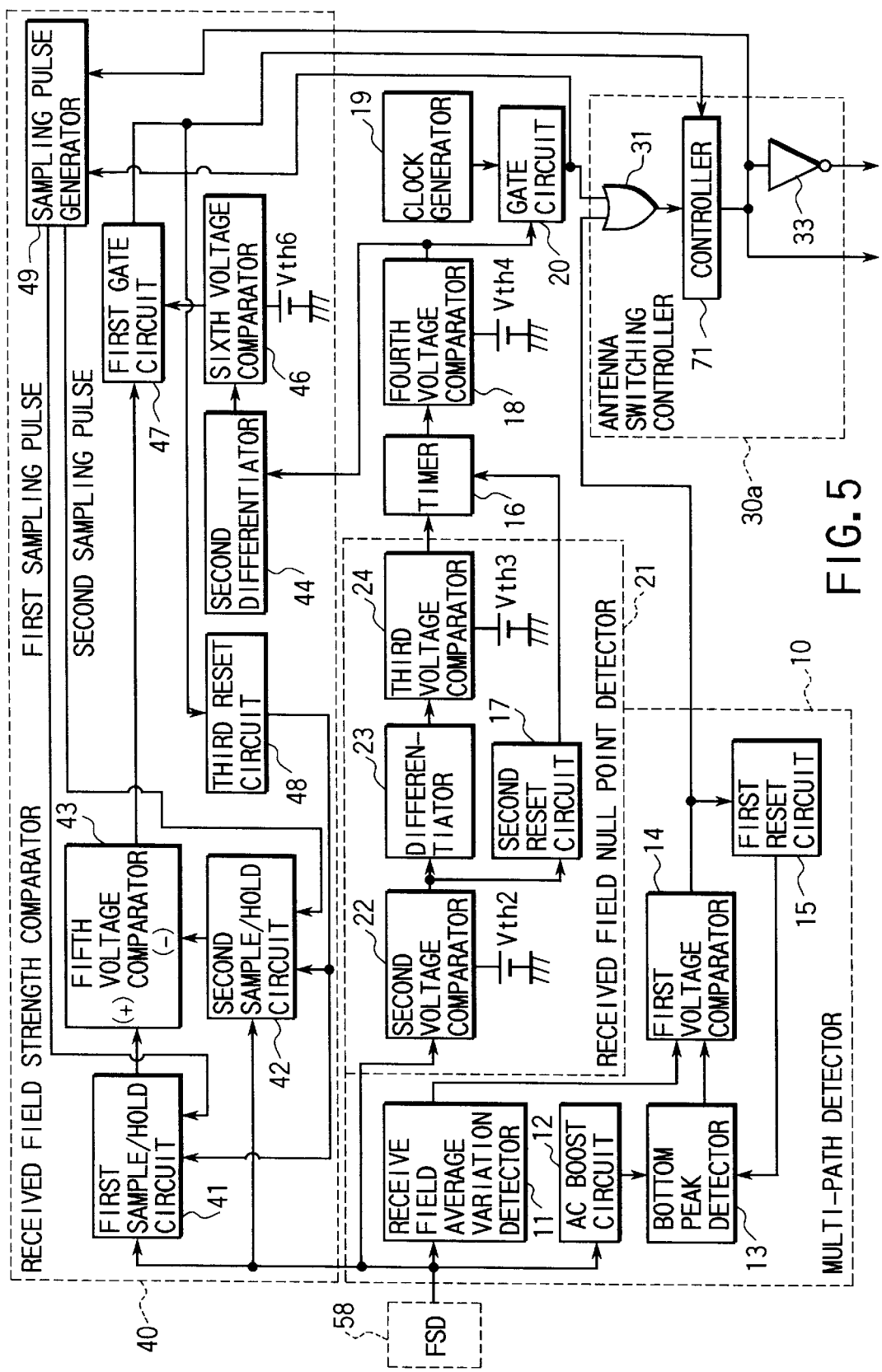
FIG. 5 is a block diagram showing an antenna diversity controller in an automobile FM receiving apparatus according to the second embodiment of the present invention.

FIG. 5 is a block diagram showing an antenna diversity controller in an automobile FM receiving apparatus according to the second embodiment of the present invention, which is used as the antenna diversity controller shown in FIG. 1.

The antenna diversity controller shown in FIG. 5 is different from that shown in FIG. 3 in the following points.

(1) The antenna diversity controller also has a received field strength comparator 40 which detects the received field strengths of two antennas during the time count operation of a timer 16, holds the detected received field strengths, compares the two held levels, and outputs the comparison result upon completion of the time count operation of the timer.

(2) An antenna switching controller 30a is modified such that the operation of automatically switching antenna connection of the receiving apparatus from one antenna side to the other for every switching time generated on the basis of the clock signal is repeated during the time count operation of the timer 16, and upon completion of the time count operation of the timer 16, one of the two antennas, which has a higher received field strength, is selected on the basis of the comparison output from the received field strength comparator 40.

The remaining arrangements are the same as in FIG. 3. The same reference numerals as in FIG. 3 denote the same parts in FIG. 5, and a detailed description thereof will be omitted.

The received field strength comparator 40 comprises a first sample/hold circuit 41, a second sample/hold circuit 42, a fifth voltage comparator 43, a second differentiator 44, a sixth voltage comparator 46, a first gate circuit 47, a third reset circuit 48, and a sampling pulse generator 49.

The first sample/hold circuit 41 receives a first sampling pulse signal and holds the received field detection level (in this example, the output from the FSD 58 shown in FIG. 1).

The second sample/hold circuit 42 receives a second sampling pulse signal and holds received field detection level.

The fifth voltage comparator 43 compares the level held by the first sample/hold circuit 41 with that held by the second sample/hold circuit 42.

The second differentiator 44 differentiates the output from a fourth voltage comparator 18.

The sixth voltage comparator 46 compares the output level from the second differentiator 44 with a predetermined reference potential Vth6 and outputs the comparison result. A pulse signal having a predetermined width is output through the second differentiator 44 and the sixth voltage comparator 46 from the end edge of the time count period of the timer 16.

The first gate circuit 47 controls the passage period of the output signal from the fifth voltage comparator 43 on the basis of the output from the sixth voltage comparator 46.

The third reset circuit 48 generates, on the basis of the output from the first gate circuit 47, a third reset signal for resetting the first sample/hold circuit 41 and the second sample/hold circuit 42.

The sampling pulse generator 49 generates the first and second sampling pulse signals.

In the above arrangement, the received field detection level of a first antenna 51 is held by the first sample/hold circuit 41, and the received field detection level of a second antenna 52 is held by the second sample/hold circuit 42.

In this case, when the level held by the first sample/hold circuit 41 is higher than that held by the second sample/hold circuit 42, the output signal from the fifth voltage comparator 43 goes "H". This signal of "H" level is input to a controller 71 through the first gate circuit 47.

When the level held by the first sample/hold circuit 41 is lower than that held by the second sample/hold circuit 42, the output signal from the fifth voltage comparator 43 goes "L". This output signal of "L" level is input to the controller 71.

The antenna switching controller 30a comprises an OR circuit 31, an inverter 33, and the controller 71.

Every time the output from the OR circuit 31 is received, the output from the controller 71 is inverted and reset in response to the signal of "H" level, which is output from the first gate circuit 47. The set output signal of "H" level is used to control the antenna switching circuit (50 in FIG. 1) to select the first antenna 51.

The output signal from the controller 71, which is inverted by the inverter 33, is used to control the antenna switching circuit (50 in FIG. 1) to select the second antenna 52.

The sampling pulse generator 49 is constituted by a logic circuit such that the first sampling pulse signal is generated in, e.g., the second half of the first antenna selection period and the second sampling pulse signal is generated in, e.g., the second half of the second antenna selection period using the output signal from the controller 71 and the output from a second gate circuit 20.

Figure 6:
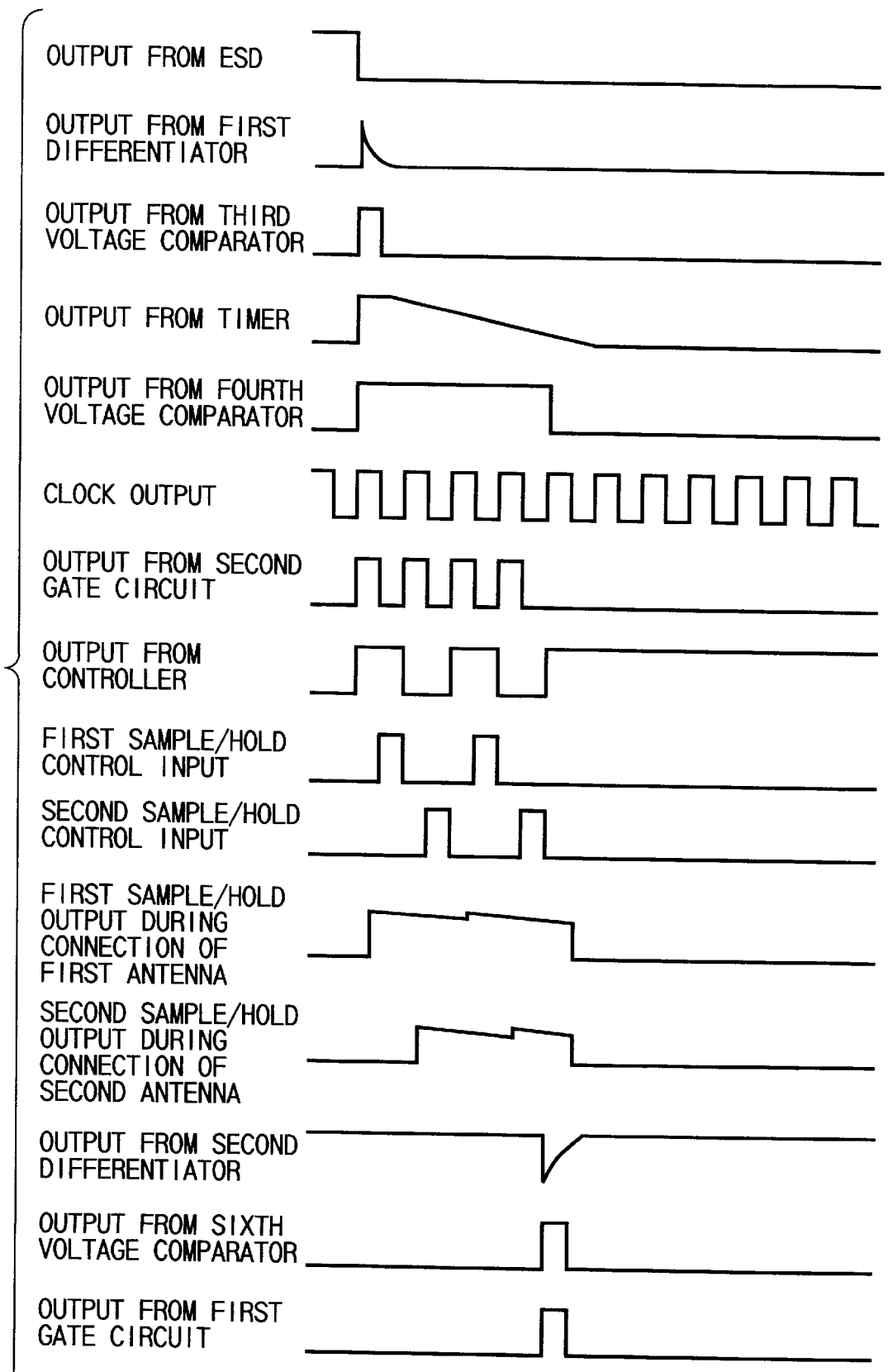
FIG. 6 is a graph showing waveforms so as to explain the operation of the antenna diversity controller according to the second embodiment of the present invention.

The operation of the antenna diversity controller having the arrangement shown in FIG. 5 will be described next with reference to waveforms shown in FIG. 6.

A received field null point detector 21 detects the period in which the received field strength abruptly lowers (drops to the null point). In response to the detection output, the timer 16 is started to perform the time count operation.

During the time count operation of the timer 16, the antenna switching controller 30a repeats the operation of automatically switching antenna connection of the FM receiving apparatus from one antenna side to the other for every switching time generated on the basis of the clock signal. The received field strength comparator 40 detects the received field strengths of the two antennas, holds the detected received field strengths, and compares the two held levels.

Upon completion of the time count operation of the timer, the first gate circuit 47 in the received field strength comparator 40 passes the comparison result. The antenna switching controller 30a performs control to select one of the two antennas, which has a higher received field strength, on the basis of the comparison output from the received field strength comparator 40. After this, the basic operation of normal antenna switching diversity is enabled.

According to the antenna diversity controller of the second embodiment, when no radio wave can arrive at the currently connected antenna (or the received field strength lowers), the two antennas are alternately switched within a predetermined time. For this reason, the antenna connection switching condition can be obtained. After the elapse of the predetermined time, one of the two antennas, which has a higher received field strength, is selected, so the reception state can be maintained.

In each of the above embodiments, the antenna diversity controller is formed on the same semiconductor chip as that of a pilot signal (19 kHz) PLL (Phase-Locked Loop) in the stereodemodulator of the FM receiving apparatus. As a clock generator 19, a frequency divider which frequency-divides the output from a VCO (Voltage-Controlled Oscillator) for generating, e.g., a 912-kHz signal in the pilot PLL can be used.

As the clock generator 19, a frequency divider which frequency-divides a reference clock of a microcomputer or a DSP (Digital Signal Processor) may also be used.

In the FM receiving apparatus shown in FIG. 1, multi-path noise is detected on the basis of the output (signal meter output) from the FSD 58. However, the multi-path noise may be detected on the basis of noise in the FM demodulation output.

The FM demodulation signal may be subjected to processing (e.g., processing of forcibly converting the stereo output signal into a monaural output signal to reduce noise in the auditory sense or processing of removing a high-frequency component in the stereo output signal to improve the sound quality) using the multi-path noise detection output.

The antenna diversity controller of the embodiment shown in FIG. 3 can be effectively used when the received field of one antenna can move from the null point or change from the weak field.

However, a case wherein the received field cannot move from the null point or change from the weak field can also be considered. The antenna diversity controller of this embodiment as shown in FIG. 5 is effective in such a case.

Figure 7:
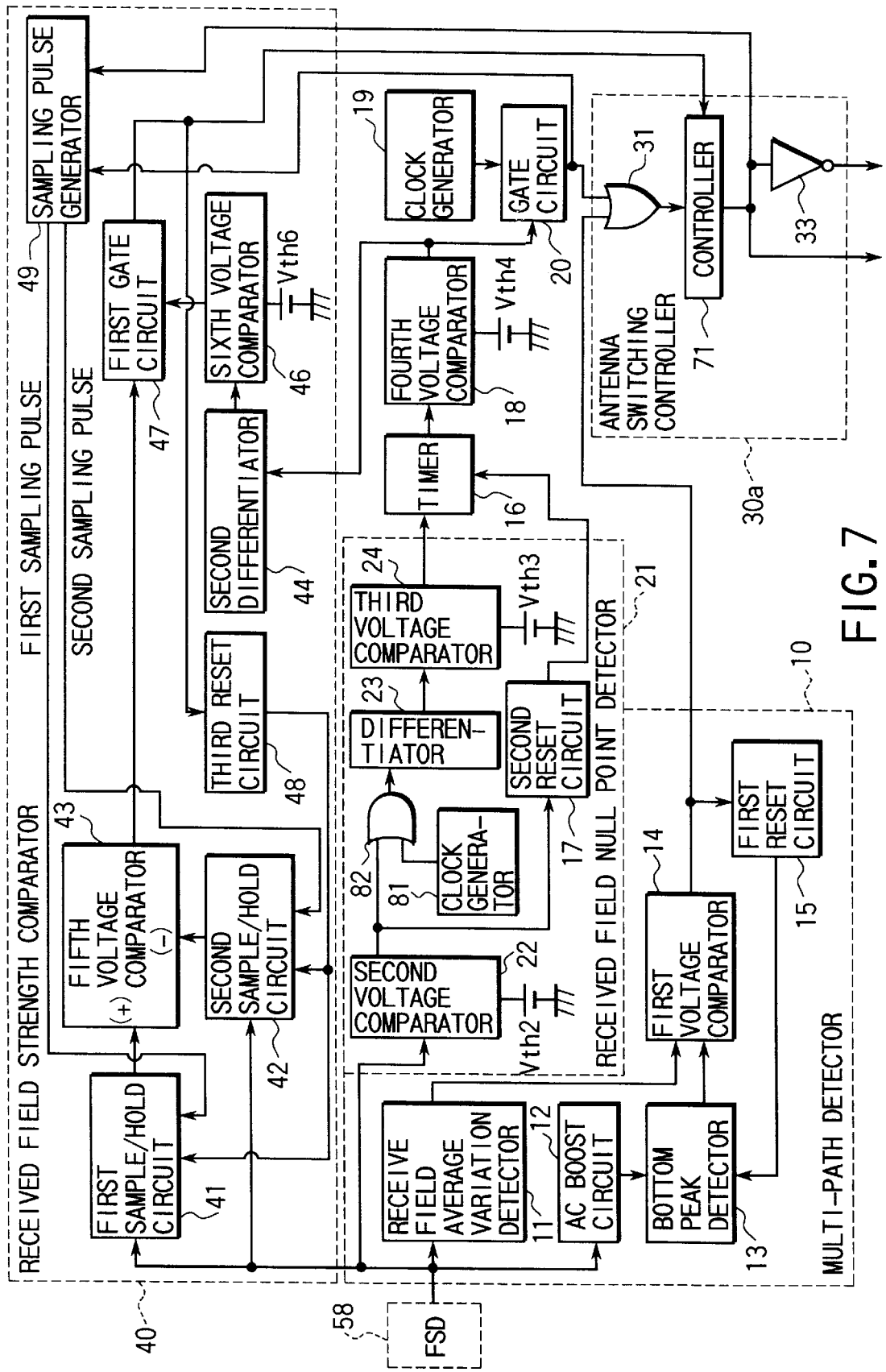
FIG. 7 is a block diagram showing an antenna diversity controller according to the third embodiment of the present invention.

FIG. 7 is a block diagram showing the antenna diversity controller according to the third embodiment of the present invention. The same reference numerals as in FIG. 5 denote the same parts in FIG. 7, and a detailed description thereof will be omitted. Only different points will be described below.

The antenna diversity controller of this embodiment is formed by inserting a clock generator 81 and an OR circuit 82 between a second voltage comparator 22 and a first differentiator 23 in the antenna diversity controller of the second embodiment.

The clock generator 81 generates a clock having a long period. The output from the clock generator 81 is output to the first differentiator 23 through the OR circuit 82. In response to this output, antennas are switched by the antenna switching controller 30a and received field strength comparator 40.

Therefore, even when the received field cannot move from the null point or change from the weak field for reason that a automobile can not be moved etc., one of the antennas, which has a higher received field strength, can be connected at a predetermined timing by a change of the electric field intensity in accordance with the movement of an other automobile.

As has been described above in detail, according to the receiving apparatus with diversity of the present invention, when the radio wave cannot arrive at the currently connected antenna, connection is automatically switched to the other antenna after the elapse of a predetermined time. With this arrangement, as far as the radio wave is arriving at the other antenna, the reception state can be maintained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

I claim:

1. A receiving apparatus with diversity, comprising:
   first reception means for receiving a radio signal;
   second reception means for receiving a radio signal;
   selection means for selecting one of said first and second reception means;
   detection means for detecting that an electric field intensity of the radio signal received by said first or second reception means selected by said selection means lowers to not more than a predetermined electric field intensity;

first switching means for causing said selection means to alternately select said first and second reception means during a predetermined time when said detection means detects that the electric field intensity of the radio signal lowers to not more than the predetermined electric field intensity; and termination means for terminating selection by the first switching means when the electric field intensity of the radio signal received by the one of the first and second reception means selected by the selection means increases to more the predetermined electric field intensity after the detection means detects that the electric field intensity of the radio signal received by the first or second reception means selected by said selection means lowers to not more than the predetermined electric field.

2. An apparatus according to claim 1, further comprising:

multi-path detection means for detecting whether the radio signal received by said first or second reception means selected by said selection means is affected by a multi-path, and second switching means for causing said selection means to switch selection between said first reception means and said second reception means when said multi-path detection means detects that the received radio signal is affected by the multi-path.

3. An apparatus according to claim 1, wherein said first and second reception means have different electrical phases with each other, respectively.

4. An apparatus according to claim 1, wherein the detection means further comprises means for causing the selection means to forcefully select one of the first and second reception means at a predetermined period independently of whether the electric field intensity of the received radio signal lowers to not more than the predetermined electric field intensity.

5. A receiving apparatus with diversity, comprising:

first reception means for receiving a radio signal;

second reception means for receiving a radio signal;

selection means for selecting one of said first and second reception means;

detection means for detecting that an electric field intensity of the radio signal received by said first or second reception means selected by said selection means lowers to not more than a predetermined electric field intensity; and first switching means for causing said selection means to alternately select said first and second reception means during a predetermined time when said detection means detects that the electric field intensity of the radio signal lowers to not more than the predetermined electric field intensity, wherein said switching means comprises a timer for outputting a time measurement signal for measuring a time when said detection means detects that the electric field intensity of the received radio signal lowers to not more than the predetermined electric field intensity, pulse signal output means for outputting a pulse signal corresponding to the time measurement signal output from said timer, clock generation means for generating a clock signal for causing said selection means to switch selection between said first reception means and said second reception means, and gate means for outputting the clock signal generated by said clock generation means to said selection means while said pulse signal output means is outputting the pulse signal, and said selection means comprises a flip-flop circuit whose output is inverted every time the clock signal which passes through said gate means is received.

6. An apparatus according to claim 5, wherein the clock signal generated by said clock generation means is obtained by frequency-dividing an output from a VCO in a pilot signal PLL in a stereodemodulator of an FM receiving apparatus.

7. An apparatus according to claim 5, wherein the clock signal generated by said clock generation means is obtained by frequency-dividing a reference clock of a microcomputer or a digital signal processor.

8. An apparatus according to claim 5, further comprising:

first holding means for holding a field strength of the radio signal received by said first reception means, second holding means for holding a field strength of the radio signal received by said second reception means; and comparison means for comparing the field strength held by said first holding means with that held by said second holding means, and wherein said selection means selects one of said first reception means and said second reception means, which has a higher received field strength, on the basis of a comparison result from said comparison means after the pulse signal is output from said pulse signal output means.

9. A receiving apparatus with diversity, comprising:

a first antenna for receiving a radio signal;

a second antenna for receiving a radio signal;

an antenna switching controller for selecting one of the first and second antenna;

a null point detector for detecting that an electric field intensity of the radio signal received the first or second antennas selected by the antenna switching controller lowers to not more than a predetermined electric field intensity; and a first switching circuit for causing the antenna switching controller to alternately select the first and second antennas during a predetermined time when the null point detector detects that the electric field intensity of the radio signal lowers to not more than the predetermined electric field intensity, wherein the first switching circuit terminates selection when the null point detector detects that the electric field intensity of the radio signal received from the first antenna or the second antenna selected by the antenna switching controller increases to more the predetermined electric field intensity after the null point detector detects that the electric field intensity of the radio signal by the first or second antennas lowers to not more than the predetermined electric field intensity.

10. An apparatus according to claim 9, further comprising:

a multi-path detector for detecting whether the radio signal received by said first or second antenna selected by the antenna switching controller is affected by a multi-path and for causing the antenna switching controller to switch selection between the first and second antennas when said multi-path detector detects that the received radio signal is affected by the multi-path.

11. An apparatus according to claim 10, wherein the first and second antennas have different electrical phase with each other, respectively.

12. An apparatus according to claim 10, wherein the null point detector further comprises a circuit for causing the selection means for forcefully selecting one of the first and second reception means at a predetermined period independently of whether the electric field intensity of the received radio signal lowers to not more than the predetermined electric field intensity.

13. A receiving apparatus with diversity, comprising:

a first antenna for receiving a radio signal;

a second antenna for receiving a radio signal;

an antenna switching controller for selecting one of the first and second antenna;

a null point detector for detecting that an electric field intensity of the radio signal received the first or second antennas selected by the antenna switching controller lowers to not more than a predetermined electric field intensity; and a first switching circuit for causing the antenna switching controller to alternately select the first and second antennas during a predetermined time when the null point detector detects that the electric field intensity of the radio signal lowers to not more than the predetermined electric field intensity, wherein the first switching circuit comprises, a timer for outputting a time measurement signal for measuring a time when said null point detector detects that the electric field intensity of the received radio signal lowers to not more than the predetermined electric field intensity, a pulse signal generator for outputting a pulse signal corresponding to the time measurement signal output from said timer, a clock generator for generating a clock signal for causing the antenna switching controller to switch selection between said first and second antennas, and a gate circuit for outputting the clock signal generated by said clock generator to the antenna switching controller while said pulse signal generator is outputting the pulse signal, and the antenna switching controller comprises, a flip-flop circuit whose output is inverted every time when the clock signal which passes through said gate circuit is received.

14. An apparatus according to claim 13, wherein the clock signal generated by the clock generator is obtained by frequency-dividing an output from a VCO in a pilot signal PLL in a stereo-demodulator of an FM receiving apparatus.

15. An apparatus according to claim 13, wherein the clock signal generated by the clock generator is obtained by frequency-dividing a reference clock of a microcomputer or a digital signal processor.

16. An apparatus according to claim 13, further comprising:

a first holding circuit for holding a field strength of the radio signal received by said first antenna;

a second holding circuit for holding a field strength of the radio signal received by said second antenna; and a comparator for comparing the field strength held by said first holding circuit with that held by said second holding circuit, and wherein said antenna switching controller selects one of the first and second antennas, which has a higher received field strength, on the basis of a comparison result from said comparator after the pulse signal is output from said pulse signal generator.

* * * * *